United States Patent [19]

Kuzuoka

[11] Patent Number: 5,410,291

[45] Date of Patent: Apr. 25, 1995

[54] THERMISTOR TYPE TEMPERATURE SENSOR

[75] Inventor: Kaoru Kuzuoka, Toyota, Japan

[73] Assignee: Nippondenso Co., Ltd., Kariya, Japan

[21] Appl. No.: 112,150

[22] Filed: Aug. 26, 1993

[30] Foreign Application Priority Data

Sep. 1, 1992 [JP] Japan .................. 4-257343

[51] Int. Cl.⁶ .................. H01C 1/012; H01C 7/00; H01C 1/01; G01K 7/22
[52] U.S. Cl. .................. 338/22 R; 338/25; 338/306; 338/320; 374/185
[58] Field of Search ............... 338/306, 22 R, 25, 320; 374/185

[56] References Cited

U.S. PATENT DOCUMENTS

| | | | |
|---|---|---|---|
| 1,631,836 | 6/1927 | Spray | 338/25 |
| 3,749,879 | 7/1973 | Armstrong | 338/22 R |
| 4,147,927 | 4/1979 | Pirotte | 338/22 R |
| 4,332,081 | 6/1982 | Francis | 338/25 |
| 4,722,609 | 2/1988 | Epstein et al. | 338/25 |
| 4,766,409 | 8/1988 | Mandai | 338/25 |
| 4,912,450 | 3/1990 | Yoneda et al. | 338/22 R |
| 4,967,176 | 10/1990 | Horsma et al. | 338/22 R |
| 5,010,315 | 4/1991 | Fedter et al. | 338/25 |
| 5,057,672 | 10/1991 | Bohlender et al. | 338/22 R |
| 5,199,791 | 4/1993 | Kasanumi et al. | 338/320 |

FOREIGN PATENT DOCUMENTS

| | | | |
|---|---|---|---|
| 0150922 | 5/1937 | Austria | 338/320 |
| 0266264 | 11/1968 | Austria | 338/25 |
| 3829764 | 3/1989 | Germany | 338/25 |
| 63-78503 | 4/1988 | Japan . | |
| 110701 | 4/1989 | Japan | 338/25 |
| 287032 | 3/1990 | Japan . | |
| 404150001 | 5/1992 | Japan | 338/22 R |
| 405082303 | 4/1993 | Japan | 338/22 R |

Primary Examiner—Diego F. F. Gutierrez
Attorney, Agent, or Firm—Cushman, Darby & Cushman

[57] ABSTRACT

A thermistor-type temperature sensor having multiple temperature-sensitive elements can detect a wide range of temperatures. In a preferred embodiment, the sensor uses multiple thin thermo-resistive elements having different electrical characteristics, where the elements are disposed on insulating ceramic substrates and covered by insulating sheets. This arrangement provides a low-profile thermistor-type sensor operable over a wide range of temperatures.

9 Claims, 5 Drawing Sheets

THERMISTOR TYPE TEMPERATURE SENSOR

BACKGROUND OF THE INVENTION

1. Field of the Invention

The present invention relates to a thermistor type temperature sensor and, more particularly, to a wide-range thermistor type temperature sensor.

2. Description of the Related Art

In recent years, there have been increasing demands for a temperature sensor with high reliability and high precision. A thermistor element 111 is shown in FIG. 10 as a conventional thermistor type temperature sensor used in high temperature regions. Electrode wires 491 and 492 are connected to the end portions of the thermistor element 111, which is buried in an insulating ceramic 512 and housed in a metallic protective tube 51. Temperature is computed by measuring the resistance value thereof from a lead terminal 511.

In another known high-temperature thermistor element which is disclosed in, for example, Japanese Patent Laid-Open No. 63-78503, a thermistor is buried in an oxide ceramic layer, and formed into an integral unit.

However, it is necessary to house a plurality of thermistor elements each having a different temperature measurement range in order to widen the temperature measurement range of the thermistor type temperature sensor to form a wide-range thermistor type temperature sensor.

However, in the conventional thermistor type temperature sensor, shown in FIG. 10, having a thermistor element housed in a metallic protective tube, a plurality of thermistor elements must be housed therein, causing the problem, for example, that the size of the temperature sensor itself becomes bigger. In addition, heat capacitance becomes large because of the enlargement of the temperature sensor itself, and the internal temperature distribution becomes non-uniform. Consequently, the responsiveness of the thermistor type temperature sensor becomes markedly worse, causing another problem, in that the accuracy of measured temperatures decreases. If, however, the thermistor type temperature sensor is unreasonably miniaturized, durability in high temperatures decreases considerably because each thermistor element is formed into a thin member.

SUMMARY OF THE INVENTION

In view of the above-described problems of the prior art, it is an object of the present invention to provide a wide-range thermistor type temperature sensor having high responsiveness and high precision.

According to one aspect of the present invention, a thermistor type temperature sensor is provided comprising: a mounting sheet formed from insulating ceramic; a plurality of thermistor elements disposed on the mounting sheet; a detecting device, disposed on the mounting sheet, for electrically conducting with the thermistor elements and detecting changes in the resistance value of the thermistor element; and a cover sheet for hermetically sealing the thermistor element and the detecting device to the mounting sheet by thermocompression-bonding.

According to another aspect of the present invention, a thermistor type temperature sensor is provided comprising: a first thermistor type temperature sensor in which a first thermistor element is covered by a sheet formed from insulating ceramic; and a second thermistor type temperature sensor, which is stacked on the first thermistor type temperature sensor, in which a second thermistor element is covered by a sheet formed from insulating ceramic. The thermistor element is available in a paste form, a sheet form manufactured by a doctor blade method, a thin film form or the like.

According to the first aspect of the present invention, a compact wide-range thermistor type temperature sensor can be obtained by hermetically sealing a plurality of thermistors to a mounting sheet and a cover sheet.

According to the second aspect of the present invention, since the thermistor type temperature sensor is covered by sheets formed from sheet-like insulating ceramic and these sheets are stacked, the entire temperature sensor can be made compact.

In particular, the thermistor element is preferably formed flat. Such a form makes it possible to miniaturize the thermistor type temperature sensor even more.

In addition to the above, if the first and second thermistors should be disposed on the same sheet, they may overlap. In the present invention, since the first and second thermistor elements are laminated, they will not overlap.

According to the present invention, as described above, a wide-range thermistor type temperature sensor having high responsiveness and high precision can be provided.

The above and further objects and novel features of the invention will be more apparent from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Preferred embodiments of the present invention will be explained below with reference to the accompanying drawings.

First Embodiment

Figure 1:
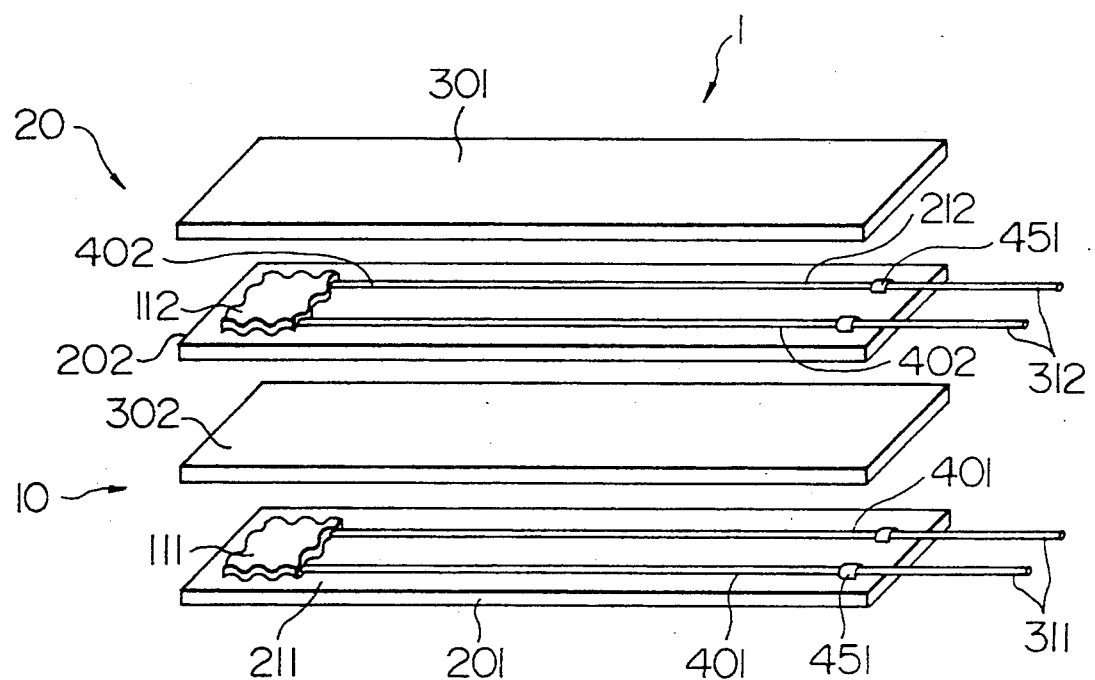
FIG. 1 is an exploded perspective view of a thermometering section of a thermistor type temperature sensor in accordance with a first embodiment of the present invention.
Figure 4:
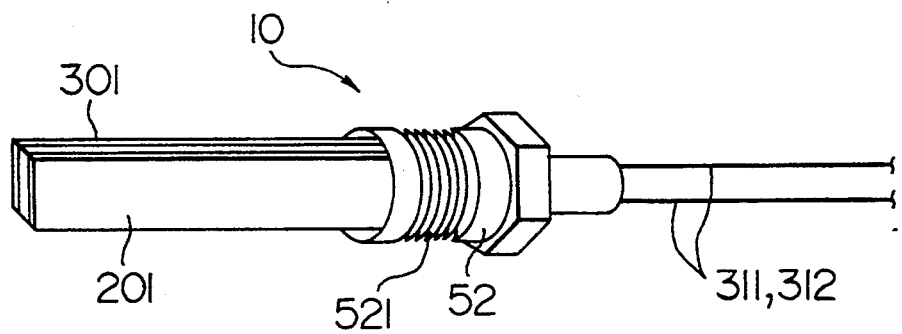
FIG. 4 is a perspective view of the thermistor type temperature sensor in accordance with the first embodiment of the present invention.

As shown in FIGS. 1 and 4, this embodiment pertains to a thermistor type temperature sensor 1 in which a first, flat temperature sensor 10 formed of a first thermistor element 111 which is interposed between a mounting sheet 201 and a cover sheet 302, and a second temperature sensor 20 formed of a second thermistor element 112 which is interposed between a mounting sheet 202 and a cover sheet 301 are stacked on one another, all of the above sheets being formed from insulating ceramic.

The thermistor type temperature sensor 1, as shown in FIG. 1, comprises mounting sheets 201 and 202 formed from insulating ceramic, cover sheets 301 and 302 formed from insulating ceramic, and lead members 311 and 312 formed of lead wires. The first and second thermistor elements 111 and 112 are mounted on the mounting sheets 201 and 202, and a pair of internal electrodes 401 and 402 are mounted thereon for connecting the thermistor elements 111 and 112 to the lead members 311 and 312, respectively. The cover sheets 301 and 302 are thermocompression-bonded onto the mounting surfaces 211 and 212 of the mounting sheets 201 and 202, respectively.

Each component will be explained below.

Figure 2:
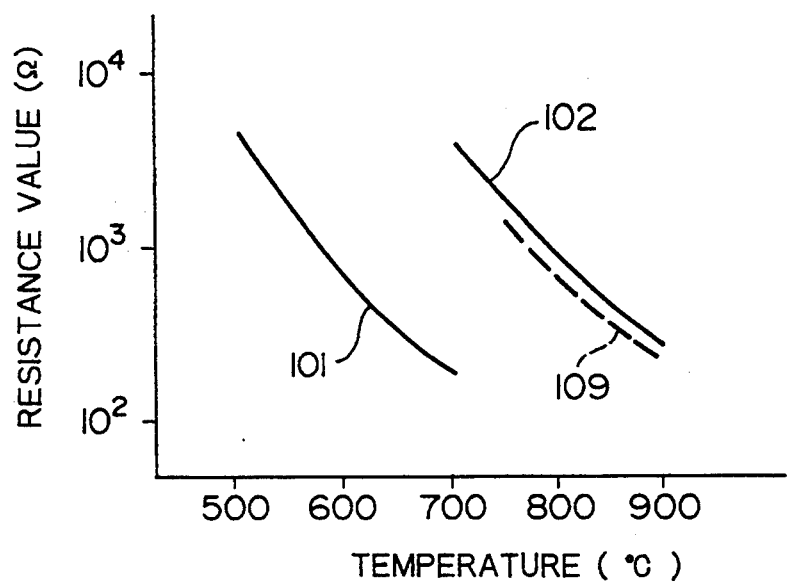
FIG. 2 is a resistance-temperature characteristic view of the thermistor type temperature sensor in accordance with the first embodiment of the present invention.

The thermometering section of the thermistor type temperature sensor 1 of this embodiment comprises two thermistor elements 111 and 112, as shown in FIG. 1. The temperature measurement range of the first thermistor element 111 is different from that of the second thermistor element 112. The thermistor element 111 for a low temperature region, which is the first thermistor element, has a temperature range of 500° to 700° C., as shown in the resistance-temperature curve 101 of FIG. 2. The thermistor element 112 for a high temperature region, which is the second thermistor element, has a temperature range of 700° to 900° C., as shown in the resistance temperature curve 102 of FIG. 2.

in FIG. 2, a dashed-line curve 109 indicates an example of a conventional thermistor type temperature sensor having one thermistor element. The thermistor elements 111 and 112 have a resistance value selected from 100 to 50K Ω by matching with an external circuit.

The thermistor elements 111 and 112 are formed by printing a pasty material onto the mounting sheets 201 and 202. The paste for the thermistor element 111 for low temperatures is manufactured by mixing 30% (weight percentage, the same applies hereinafter) $Mn_{1.5}Cr_{1.5}O_4$ to 70% $YCrO_3$, adding an organic binder, such as 3% ethyl cellulose or 7% terpineol, and kneading them. The paste for the thermistor element 112 for high temperatures is manufactured by mixing 50% $Mn_{1.5}Cr_{1.5}O_4$ to 50% $YCrO_3$, adding the organic binder the same as above, and kneading them. The thermistor elements 111 and 112 are printed on the mounting surfaces 211 and 212 of the mounting sheets 201 and 202, respectively. The mounting sheets 201 and 202 and the cover sheets 301 and 302 are sheets formed from insulating ceramic, such as alumina or zirconium, having high resistance to heat.

Next, an example of manufacturing the mounting sheets 201 and 202 and the cover sheets 301 and 302 will be explained.

Initially, 5% of one or more types of a sintering assistant, for example, MgO, $SiO_2$ or kaolin, is added to 95% $Al_2O_3$. Then, an organic binder, a solvent, a plasticizer, and a dispersant are added thereto and mixed, and thus a slurry is produced. Thereafter, an alumina sheet, 300 μm thick, is produced from this slurry by a doctor-blade method. Then, the alumina sheet is cut into 5×50 mm strips.

Next, a Pt paste is printed with a thickness of 20 μm in accordance with a previously designed pattern, and thus internal electrodes 401 and 402 are formed on the mounting sheets 201 and 202. The thermistor elements 111 and 112 are printed on the mounting sheets 201 and 202, as was also mentioned earlier.

The thickness of the thermistor elements 111 and 112 is from 100 to 200 μm, and they cover one of the ends of each of the internal electrodes 401 and 402. The other ends of the internal electrodes 401 and 402 are connected through a connection member 451 to the lead members 311 and 312 formed from Pt lead wires.

The cover sheets 301 and 302 are thermocompression-bonded onto the mounting surfaces 211 and 212 of the mounting sheets 201 and 201 so that the thermistor elements 111 and 112, the internal electrodes 401 and 402 and the connection member 451 are buried. In this embodiment, thermocompression-bonding is performed for three minutes at 90° C. and 9.8 Mpa by a pressure pressing machine. Thereafter, the thermocompression-bonded product is sintered for one hour at 1,550° C. by an electric furnace.

One of the ends of each of the lead members 311 and 312 is connected to the internal electrodes 401 and 402 as described above, whereas the other ends are extended to the outside of the mounting sheets 201 and 202. The temperature sensor 10 is integrally formed with a mounting member 52 comprising a screw portion 521, as shown in FIG. 4.

The temperature sensor 10 of this embodiment, as described above, comprises two thermistor elements 211 and 212 (see FIG. 2), each of which having a different measuring range. Therefore, since the temperature measuring range becomes 500° to 900° C., there is a measurement span of 400° C. which is twice as great as that of the prior art.

On the other hand, in this embodiment, as shown in FIG. 4, no metallic protective tube is used. The thermistor elements 111 and 112 are of a thick film type manufactured from a pasty material, and made into an integral unit in a plate form with the mounting sheets 201 and 202 and the cover sheets 301 and 302, all of which are formed from insulating ceramic. As a result, there is no structural waste, and heat transmission of the atmospheric air is good. The flat thermistor elements 111 and 112 are stacked in such a way that their respective flat surfaces face each other, and the mounting sheets 201 and 202 and the cover sheets 301 and 302 are stacked along the thickness thereof. Therefore, even if an increased number of them are used, the size does not become big. Therefore, the temperature sensor is compact, and has excellent properties for transmitting atmospheric temperature to the thermistor element, achieving high response of the thermistor element.

Figure 3:
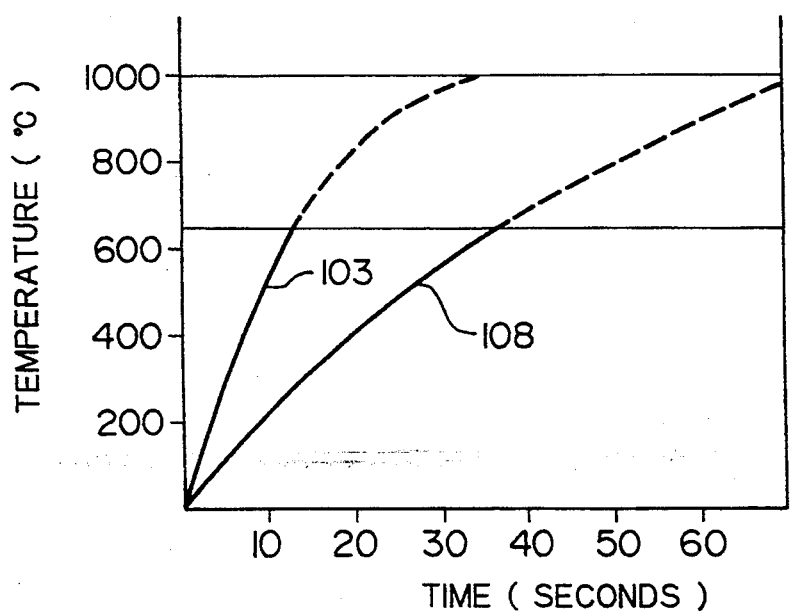
FIG. 3 is a response characteristic view of the thermistor type temperature sensor in accordance with the first embodiment of the present invention.
Figure 10:
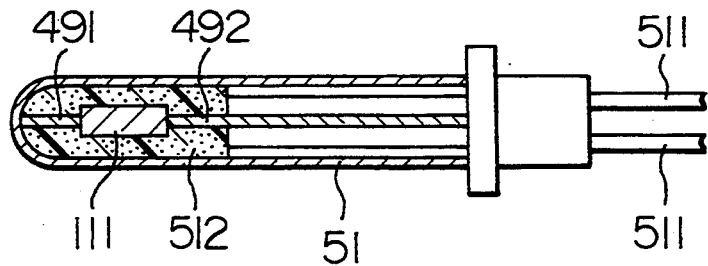
FIG. 10 is an illustration of the construction of a conventional thermistor type temperature sensor.

FIG. 3 illustrates a comparison between a conventional temperature sensor in which two thermistor elements are housed in a metallic protective tube shown in FIG. 10, and the response characteristics of the thermistor type temperature sensor of this embodiment. When both temperature sensors are placed in an atmosphere of 1,000° C., the prior art has the response curve 108 shown in FIG. 3, and a little less than 40 seconds is taken to reach a measured value of 600° C. The response curve 103 of this embodiment shows that the time is a little more than 10 seconds, and thus response is improved three times or more.

In addition, since the entirety of the thermistor elements 111 and 112 are covered with the mounting sheets 201 and 202 and the cover sheets 301 and 302, they have sufficient strength against external force, withstand adverse environments and are highly reliable.

According to this embodiment, as described above, a wide-range thermistor type temperature sensor which is compact, and has excellent strength and high response can be provided. Although in this embodiment the thermistor element is manufactured by printing a pasty material, a thermistor element in a sheet form manufactured by the doctor-blade method may be cut to a desired size and used.

In the above-described construction, the flat surfaces of the flat thermistor elements 111 and 112 are made to face each other, and points at which temperature are measured are determined to be positions covered by the flat surfaces of the flat thermistor elements 111 and 112. Thus, the thermistor elements will measure the temperature of a region proximate to a point between the two surfaces.

Second Embodiment

Figure 5:
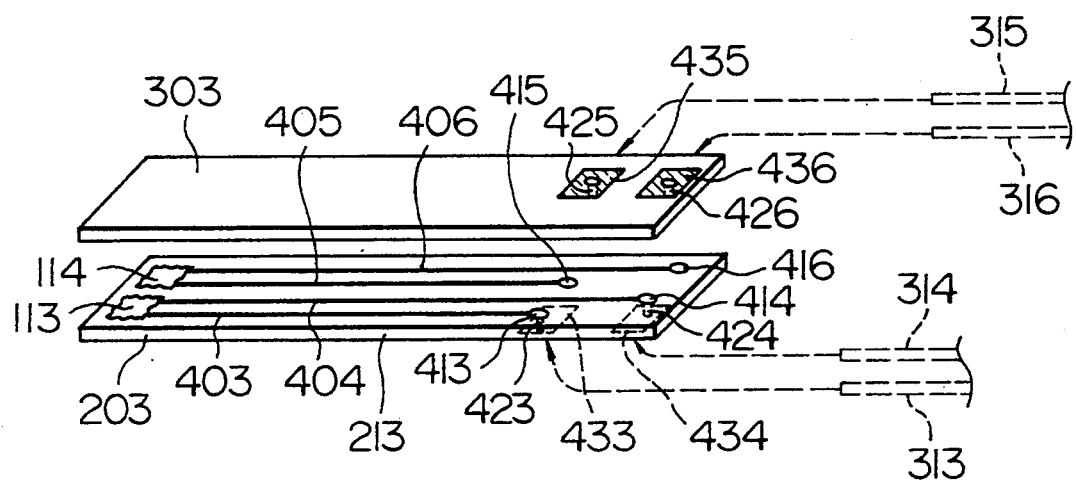
FIG. 5 is an exploded perspective view of a thermometering section of a thermistor type temperature sensor in accordance with a second embodiment of the present invention.

In this embodiment, as shown in FIG. 5, there is one mounting sheet 203 and one cover sheet 303, and the method of connecting four internal electrodes 403 to 406 to lead members 313 to 316 respectively is changed, in the first embodiment.

In this embodiment, two thermistor elements 113 and 114 and four internal electrodes 403 to 406 are printed on a mounting surface 213 of one mounting sheet 203. Lands 413 to 416 are formed in one of the ends of each of the internal electrodes 403 to 406. Through holes 423 to 426 are formed on the mounting sheet 203 or the cover sheet 303 at the positions of the lands 413 to 416. The through holes 423 to 426 are filled with an electro-conductive material such as Pt paste. Terminal plates 433 to 436 are formed on a surface opposite to the lands 413 to 416. The lead members 313 to 316 are connected no the terminal plates 433 to 436 by soldering or the like.

Since the number of mounting sheets 203 and cover sheets 303 are each one, this embodiment is more compact than the first embodiment. The connection of the lead members 313 to 316 to the internal electrodes 403 to 406 is made by connecting the lead members 313 to 316 to the terminal plates 433 to 436 disposed on the outer surfaces of the mounting sheets 203 and 303. Therefore, there is no necessity to interpose the lead member between the cover sheet and the mounting sheet by thermocompression-bonding. Consequently, thermistor elements can be sealed more reliably, and can be easily connected to the lead member.

The other details of the arrangement are the same as the first embodiment.

Third Embodiment

Figure 6:
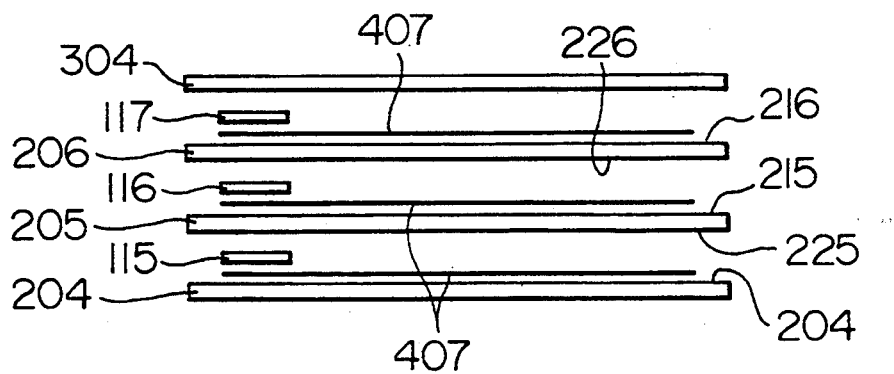
FIG. 6 is an illustration of a thermometering section of a thermistor type temperature sensor in accordance with a third embodiment of the present invention.

This embodiment pertains, as shown in FIG. 6, to an arrangement in which three thermistor elements 115 to 117 are disposed in the first embodiment. In this embodiment, three mounting sheets 204 to 206 and one cover sheet 304, both of which are made of insulating ceramic, are provided. Three thermistor elements 115 to 117, each having a different measurement range, are printed on the mounting sheets 204 to 206, and a pair of internal electrodes 407 are printed on each of them. The mounting surfaces 214 to 216 of the mounting sheets 204 no 206 are covered by non-mounting surfaces 225 and 226 of the other mounting sheets 205 and 206, or a cover sheet 304.

Since three thermistor elements 115 to 117 are provided in this embodiment, it is possible to widen the temperature measurement range even more. Also, since the mounting surfaces 215 to 216 of the mounting sheets 204 to 205 are covered by non-mounting surfaces 225 and 226 of the other mounting sheets 205 and 206, only one cover sheet 304 is required. Therefore, three thermistor elements can be housed by the four insulating ceramic cover sheets the same as in the first embodiment, making it possible to save space.

The other details of the arrangement are the same as the first embodiment.

Fourth Embodiment

As disclosed in Japanese Patent Laid-Open No. 55-85001, a thick-film type thermistor has hitherto been known, the temperature sensing element of which is exposed so that the resistance value can be adjusted. With such a construction, when the thermistor element is covered with a sheet, it becomes difficult to adjust the resistance of the thermistor element itself.

For this reason, in this embodiment three or more internal electrodes are provided in the thermistor element, and the connection/disconnection of the internal electrodes to the lead member is made possible. The connection/disconnection among the internal electrodes is made possible through the connection/disconnection between the internal electrodes and the lead member. The resistance value between the two lead members can be varied in accordance with the connection mode between the internal electrodes.

That is, when there are two internal electrodes, the resistance value between the internal electrodes is limited to one kind, and no selection can be made. However, if a great number of internal electrodes are provided, since it is possible to make the resistance value between two adjacent electrodes different, the number of selectable resistance values increases. In addition to the above, since the resistance values can be varied on the basis of the connection mode between the internal electrodes, as will be described below, the range of the selectable resistance values widens considerably.

As a result, the provision of a great number of three or more internal electrodes makes it possible to select and adjust the resistance values between the lead members over a wide range.

An example in which three electrodes A, B, and C are provided as the simplest form will be considered. Resistance $R_{AB}$ between electrodes A and B, resistance $R_{BC}$ between electrodes B and C, and resistance $R_{CA}$ between electrodes C and A can be made different from each other. Resistance Re between electrodes C and a short-circuited A–B is $(R_{CA} \cdot R_{/BC})/(R_{CA} + R_{BC})$, since a parallel circuit of resistance $R_{CA}$ between C and A and resistance $R_{BC}$ between B and C is formed. Similarly, resistance $R_A$ between A and a short-circuited B–C is $(R_{AB} \cdot R_{CA})/(R_{AB}+R_{CA})$. Similarly, resistance $R_B$ between B and a short-circuited A–C is $(R_{AB} \cdot R_{BC})/(R_{BC}+R_{AB})$.

The degree of freedom for selecting a resistance value is considerably increased as a result of merely increasing the number of internal electrodes by one to three as described above, and it becomes possible to select and adjust the resistance value between the lead members. The greater the number of internal electrodes, the more such selectability and adjustability of a resistance value is increased. Making it possible to adjust the resistance value in this way makes it possible to reduce variations in the resistance value among thermistor type temperature sensors and improve the accuracy thereof.

A specific example thereof will be explained in detail as the fourth embodiment.

Figure 7:
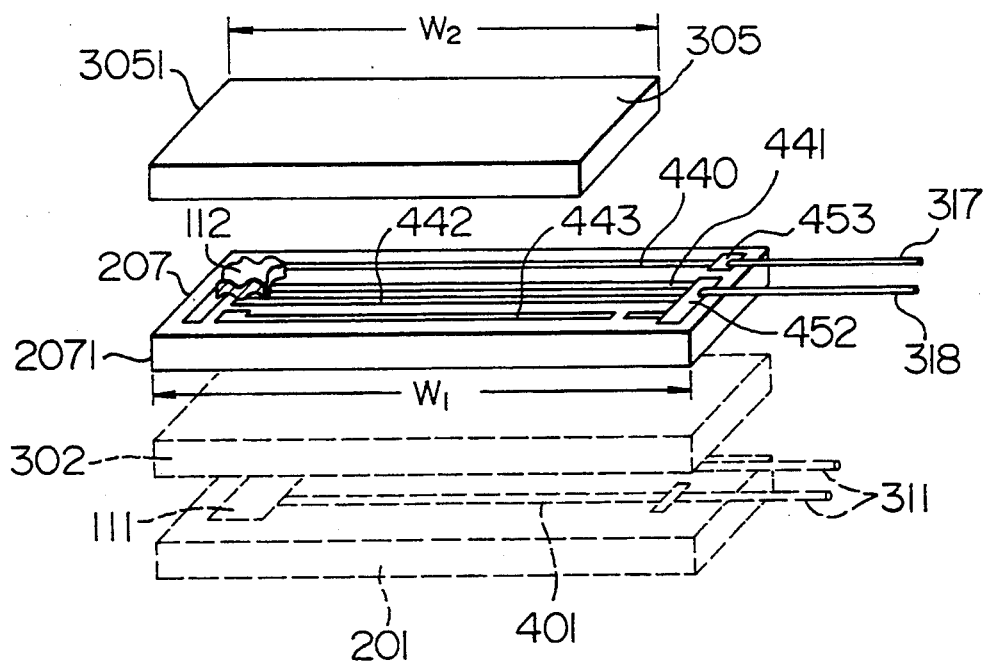
FIG. 7 is an exploded perspective view of a thermometering section of a thermistor type temperature sensor in accordance with a fourth embodiment of the present invention.

This embodiment pertains, as shown in FIG. 7, to an arrangement in which four internal electrodes 440 to 443 are disposed in an upper mounting sheet 207, and a part of the internal electrodes 410 to 413 is exposed from a cover sheet 305 in the first embodiment.

The four internal electrodes 440 to 443 are connected to the thermistor element 112 of the upper mounting sheet 207. The first internal electrode 440 is connected through a terminal plate 453 to the first lead member 317. On the other hand, the second to fourth internal electrodes 441 to 443 are connected through a terminal plate 452 to the second lead member 318.

The width $W_2$ of the upper cover sheet 305 is slightly shorter than the width $W_1$ of the lower cover sheet 302 ($W_1 > W_2$). Therefore, when the left end 3051 of the upper cover sheet 305 is made to coincide with the left end 2071 of the upper mounting sheet 207 and bonded, the right portion (the portion of the connection with the lead members 317 and 318) of the internal electrodes 440 to 443 is exposed.

More specifically, when the cover sheets 302 and 305 are thermocompression-bonded to the mounting sheets 201 and 207, the portions where the internal electrodes 440 to 443 are connected to the lead members 317 and 318 are exposed. Thereafter, the section between the internal electrodes 440 to 443 and the terminal plate 452 can be cut as desired by using a laser beam.

The resistance values between the first internal electrode 440 and the second to fourth internal electrodes 441 to 443 are denoted as follows: R. (between electrodes 440 and 441), $R_2$ (between electrodes 440 and 442), and $R_3$ (between electrodes 440 and 443). When all the second to fourth internal electrodes 441 to 443 are connected to the terminal plate 452 (the lead member 318), a parallel circuit of $R_1$ to $R_3$ is formed in the section between the lead members 317 and 318. If the fourth internal electrode 443 is disconnected (FIG. 7), a parallel circuit of $R_1$ to $R_2$ is formed in the section between the lead members 317 and 318, and the combined resistance value R increases. If any one of the second to fourth internal electrodes 441 to 443 is connected to the terminal plate 452, a single circuit formed of $R_1$ through $R_3$ is formed.

The resistance value R between the lead members 317 and 318 can be adjusted by disconnecting the second to fourth internal electrodes 441 to 443 appropriately in the above-described way. That is, it is possible to provide the second to fourth internal electrodes 441 to 443 with the function of adjustment electrodes. In this way, measurement accuracy can be improved by adjusting the resistance value between the lead members 317 and 318 in order to reduce variations in the resistance value among thermistor type temperature sensors and make the resistance value uniform.

The other details of the arrangement are the same as the first embodiment.

Fifth Embodiment

Figure 8:
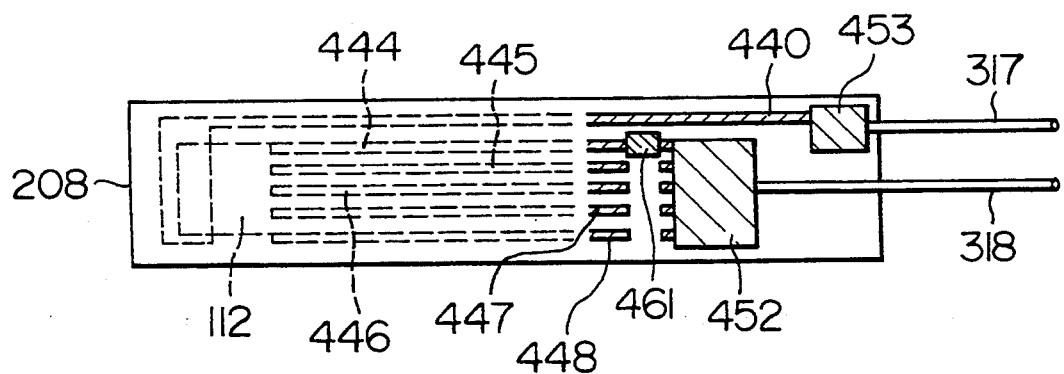
FIG. 8 is an illustration of a thermometering section of a thermistor type temperature sensor in accordance with a fifth embodiment of the present invention.

This embodiment, as shown in FIG. 8, pertains to an arrangement in which the internal electrodes 440, 444 to 448 (a total of six electrodes) are disposed on an upper mounting sheet 208, and the second to sixth internal electrodes 444 to 448 can be connected to the terminal plate 452 as desired in the fourth embodiment. This means that, in this embodiment, the second to sixth internal electrodes 444 to 448 (a total of five electrodes) having the function of the adjustment electrodes are formed.

As shown in FIG. 8, the first internal electrode 440 is connected through a terminal plate 453 to the first lead member 317. The second to sixth internal electrodes 444 to 448 are so arranged that they can be connected to the terminal plate 452 as desired, which is connected to the second lead member 318. That is, the connection of the second to sixth internal electrodes 444 to 448 to the terminal plate 452 can be made by printing Pt paste 461 as shown in FIG. 8.

If the resistances between the first internal electrode 440 and the second to sixth internal electrodes 444 to 448 are denoted as $R_1$ to $R_5$, respectively, the resistance between the first lead member 317 and the second lead member 318 can be adjusted variously.

In FIG. 8, the portion indicated by the dashed line indicates a portion which is covered with the cover sheet. The other details of the arrangement are the same as the fourth embodiment.

Sixth Embodiment

Figure 9:
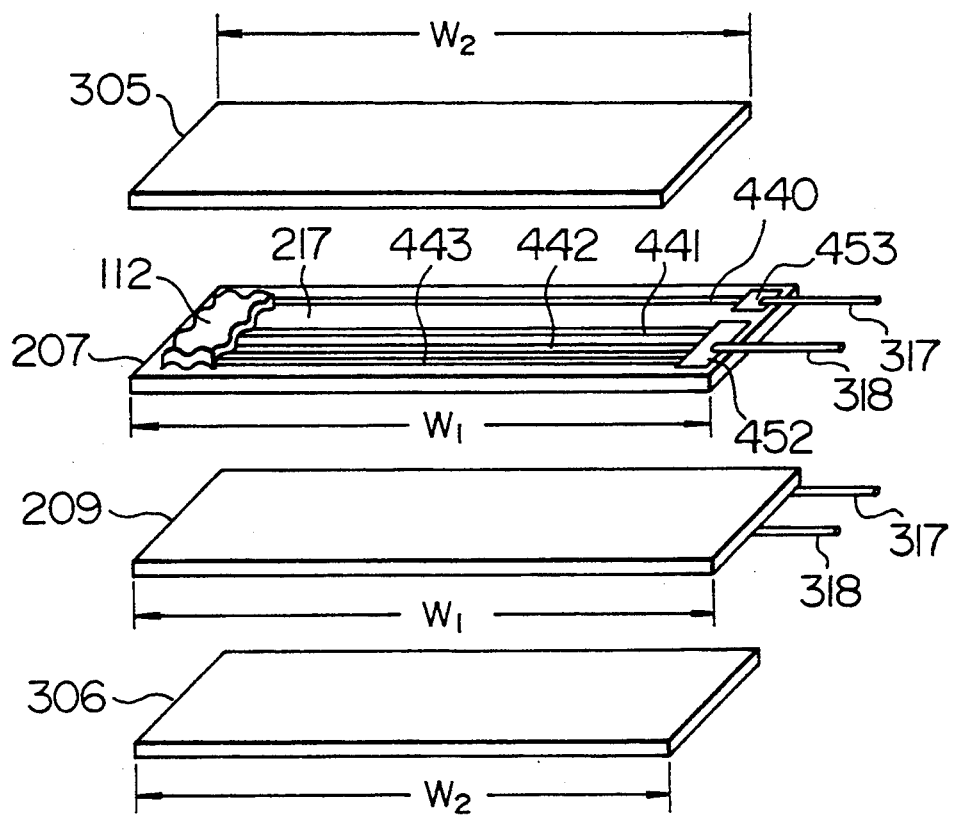
FIG. 9 is an exploded perspective view of a thermometering section of a thermistor type temperature sensor in accordance with a sixth embodiment of the present invention.

This embodiment pertains, as shown in FIG. 9, to an arrangement in which the second to fourth internal electrodes 441 to 443 which serve as adjustment electrodes are disposed in the two mounting sheets 207 and 208 similarly to the fourth embodiment (the lower mounting sheet 208 is not illustrated).

The width $W_2$ of the upper and lower cover sheets 305 and 306 is shorter than the width $W_1$ of the upper and lower mounting sheets 207 and 209. The upper and lower cover sheets 305 and 306 are disposed in the upper and lower ends, respectively. A mounting surface 217 of the upper mounting sheet 207 faces upward, and a mounting surface 219 of the lower mounting sheet 209 faces downward.

The four internal electrodes 440 to 443 are printed on the mounting surfaces of the upper and lower mounting sheets 207 and 209 similarly to the fourth embodiment. By changing the connection between the second internal electrodes 441 to 443 and the terminal plate 452, the resistance value between the lead members 317 and 318 can be adjusted.

In this embodiment, the resistance values of the two thermistor elements 111 and 112 used for low and high temperatures can be adjusted. As a result, according to this embodiment, the high-precision temperature sensor 10 with a small amount of variations over the entire measurement temperature region can be provided.

The other details of the arrangement are the same as the first embodiment.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A thermistor type temperature sensor, comprising:
   a first substrate made of insulating ceramic;
   a first thermistor type temperature sensor mounted on said first substrate and having a first thermistor element, whose resistance value is temperature dependent, covered by a first insulating ceramic sheet;
   a second substrate made of insulating ceramic; and
   a second thermistor type temperature sensor mounted on said second substrate and stacked on said first thermistor type temperature sensor, having a second thermistor element, whose resistance value is temperature dependent, covered by a second insulating ceramic sheet;
   wherein said first and second thermistor type temperature sensors are electrically separate from one another.

2. A thermistor-type temperature sensor according to claim 1, wherein said first and second thermistor elements have flat surfaces respectively, and their respective flat surfaces face each other.

3. A thermistor type temperature sensor according to claim 1, wherein said first and second thermistor elements have different respective temperature measurement ranges which collectively cover a continuous temperature range.

4. A thermistor type temperature sensor, comprising:
   a first substrate made of insulating ceramic;
   a first thermistor element mounted on said first substrate and having a flat surface whose resistance value is temperature dependent;
   a second substrate made of an insulating ceramic;
   a second thermistor element mounted on said second substrate and having a flat surface, which faces the flat surface of said first thermistor element, said two flat surfaces being disposed to measure a temperature of a region proximate to a point therebetween; and
   an insulating sheet interposed between said first and second thermistor elements;
   wherein said first and second thermistor elements are electrically separate from one another.

5. A thermistor type temperature sensor according to claim 4, wherein said first and second thermistor elements have different respective temperature measurement ranges which collectively cover a continuous temperature range.

6. A thermistor type temperature sensor, comprising:
   a first substrate portion made of insulating ceramic;
   a first thermistor type temperature sensor mounted on said first substrate portion and having a first thermistor element, whose resistance value is temperature dependent, said first thermistor element having a first operative temperature measurement range;
   a second substrate portion made of insulating ceramic; and
   a second thermistor type temperature sensor mounted on said second substrate portion and having a second thermistor element, whose resistance value is temperature dependent, said second thermistor element having a second operative temperature measurement range different from said first operative temperature measurement range;
   wherein said first and second thermistor type temperature sensors are electrically separate from one another.

7. A thermistor type temperature sensor according to claim 8 further comprising:
   a first substrate including said first substrate portion; and
   a second substrate including said second substrate portion.

8. A thermistor type temperature sensor according to claim 7 further comprising:
   at least one additional substrate made of insulating ceramic;
   at least one additional thermistor type temperature sensor, each said additional sensor being mounted on a corresponding one of said at least one additional substrate and having an additional thermistor element, whose resistance value is temperature dependent, each said additional thermistor element having a corresponding additional operative temperature measurement range different from operative temperature measurement ranges of the other thermistor elements in said sensor.

9. A thermistor type temperature sensor according to claim 6 further comprising a base substrate including said first and second substrate portions.

* * * * *